United States Patent [19]

Kuramoto et al.

[11] 3,906,532
[45] Sept. 16, 1975

[54] APPARATUS FOR PREVENTING ABNORMAL CAMERA OPERATION

[75] Inventors: Yoshio Kuramoto, Toyonaka; Toshio Kobori, Sakai; Hiroshi Ueda, Nara, all of Japan

[73] Assignee: Minolta Camera Kabushiki Kaisha, Osaka, Japan

[22] Filed: Apr. 22, 1974

[21] Appl. No.: 463,113

[30] Foreign Application Priority Data
Apr. 26, 1973   Japan.............................. 48-46755

[52] U.S. Cl. ............................................. 354/258
[51] Int. Cl.².......................................... G03B 9/58
[58] Field of Search ............ 354/226, 257, 258, 259

[56] References Cited
UNITED STATES PATENTS
3,670,636   6/1972   Holle ................................. 354/258

*Primary Examiner*—John M. Horan
*Attorney, Agent, or Firm*—Watson, Cole, Grindle & Watson

[57] ABSTRACT

In a photographic camera provided with a shutter selectively controllable either by an electrical or mechanical exposure control device when the voltage drop in the electric power source would result in the misoperation of the electrical control device to effect proper exposure, the camera is temporarily brought from a normal to an abnormal condition to prevent the subsequent photographing operation, thereby providing a warning to the photographer of the aforesaid voltage drop in the electric power source. Then, for such an abnormal condition, the operator selects mechanical exposure control and the aforesaid abnormal condition is restored to the normal condition, whereby the exposure may be controlled by the mechanical control device, thus enabling a photograph to be taken.

10 Claims, 8 Drawing Figures

3,906,532

3,906,532

APPARATUS FOR PREVENTING ABNORMAL CAMERA OPERATION

BACKGROUND OF THE INVENTION

This invention relates to apparatus for preventing abnormal operation of a photographic camera having a shutter which is selectively controllable either by electrical or mechanical exposure control mechanisms. It is well known that a shutter which is controlled by an electric exposure time control device results in improper exposure time control when the voltage at the camera electric power source drops below a given voltage. It is also known that to avoid this shortcoming, there are photographic cameras having a shutter which is selectively controllable either by an electrical or mechanical exposure time control device. With cameras of this kind, the electrical and mechanical control device are selected by a selecting member. However, if the photographer is not aware of the failure of the electrical exposure time control mechanism, repetitive condition of the electrical control device would be attempted, thereby resulting in a failure to obtain a photograph.

To avoid the aforementioned disadvantage, one of the inventors of this invention has disclosed a photographic camera in U.S. Pat. No. 3,759,156, in which in case an electrical control device is selected for controlling the exposure time for a curtain shutter, when a detecting member detects an inability of the electrical control device to control the exposure time, the shutter-cocking operation is interrupted to stop the subsequent photographing operation, thereby indicating to the photographer the abnormal conditon of the exposure time control. Then, the photographer replaces the electric power source in the camera and operates a resetting member to reset the camera from an abnormal condition to a normal condition. However, such apparatus has the disadvantage that when the selected electrical control device can no longer control the exposure time, i.e., when the camera is brought into an abnormal condition, and when the photograph is taken by resorting to the mechanical exposure time control device, the resetting operation has to be first carried out for changing the camera from the abnormal condition to the normal condition, such as by replacing the electric power cells. Additionally, the selecting member has to be operated to select the mechanical control device. In other words, two operations are required before the subsequent photograph can be taken.

It has also been proposed that the aforementioned selecting member be operated in cooperation with the removal of used power cells from the camera, to thereby permit a selecting member to select a mechanical control device rather than an electrical control device. However, if the mechanical control device is desired to be used rather than the electrical control device, then the electric cells have to be removed from the camera unnecessarily just to enable a photograph to be taken.

The aforesaid are critical disadvantages for photographing a scene which is changing.

OBJECTS OF THE INVENTION

It is an object of the present invention to provide in a photographic camera having a shutter selectively controllable either by electrical or mechanical exposure time control devices, in which when a selected electrical control device can no longer control the exposure time, and as a result the camera is in an abnormal condition, means for selecting the mechanical control device to reset the camera from the abnormal condition to the normal condition.

It is another object of the invention to provide in a photographic camera of the type specified, in which when a selected electrical control device can no longer control the exposure time for a curtain shutter and thus the camera is in an abnormal condition such that the subsequent photographing operation is interrupted by means of a stopping member, a mechanical control device which is selected by means of the aforesaid selecting member to release the locking condition due to the stopping member, for returning the abnormal condition of the camera to the normal condition, and the selecting member will open an electric-power-source switch provided for the electric control device.

These and other objects and features of the present invention will be apparent from the ensuing specification taken in conjunction with the accompanying drawings which indicate preferred embodiments of the invention.

SUMMARY OF THE INVENTION

According to the present invention, there is provided a photographic camera having a shutter selectively controllable either by an electrical or mechanical exposure time control device, characterized by means of a selecting member for selectively controlling the shutter exposure time, whereby when the aforesaid electrical control device can no longer control the exposure time because of a voltage drop in the electric power source, a detecting member detects the aforesaid condition to bring the camera into an abnormal condition, and then a stopping member stops the shutter cocking operation for the subsequent photograph. When the selecting member selects the mechanical control device, the aforesaid shutter-cocking stopping condition is released, thereby resetting the camera to a normal condition.

The aforesaid stopping member, in principle, may assume an operating position upon completion of the shutter cocking operation and a retracted position during the shutter releasing operation. In case the electrical control device is selected by means of the selecting member, with the voltage at the electric power source being maintained above a given voltage, and thus the aforesaid electrical control device may control the exposure time commensurate with the brightness of a photographic object or to the set exposure time, then the stopping member remains in the retracted position to maintain the camera in the normal condition, without interrupting the shutter cocking operation for the subsequent photograph. However, in case the electrical control device can no longer control the exposure time, a detecting member detects the aforesaid condition, thereby shifting the stopping member from the aforesaid retracted position to an operating position to stop the shutter cocking operation, even if the shutter is released, thus bringing the camera into an abnormal condition.

As long as the stopping member remains in the operating position, the camera remains in the abnormal condition. Thus, when the selecting member is moved to select the mechanical control device, the stopping member is shifted from the operating position to the retracted position, whereby the camera is returned to its normal condition.

Irrespective of whether the voltage of the electric power source is above a given voltage or not, the selecting member will open an electric-power-source switch when the selecting member assumes a position to select the mechanical control device, thereby avoiding unnecessary power consumption.

BRIEF DESCRIPTION OF THE DRAWINGS

FIGS. 3 to 8 are top views showing the relationship between a shutter member, a detecting member, a stopping member, a selecting member and a releasing member associated with the stopping member, in which FIGS. 4 and 5 illustrate a condition where the electrical control device is selected and the exposure time is normally controlled; FIG. 7 shows a condition where the mechanical control device is selected, with the shutter being released; and FIG. 8 shows a condition immediately prior to the completion of the aforesaid shutter cocking.

Figure 1:
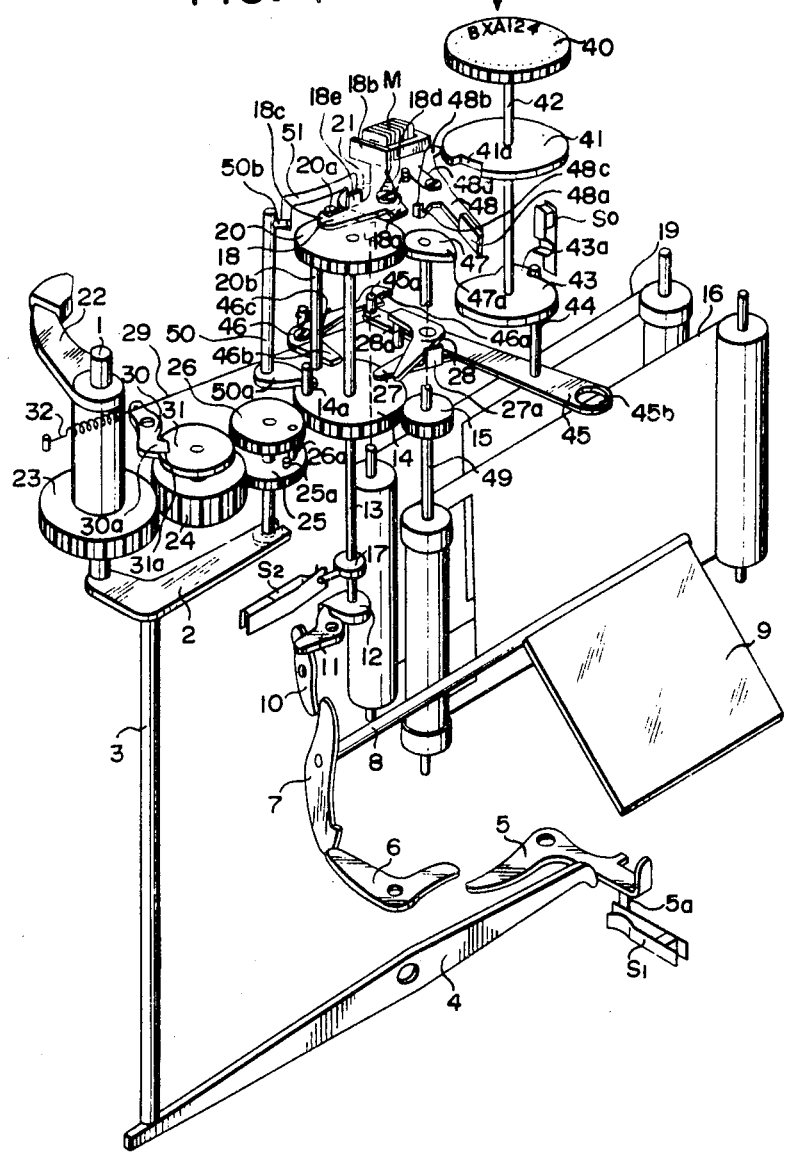
FIG. 1 is a perspective view of one embodiment of the present invention.
Figure 2:
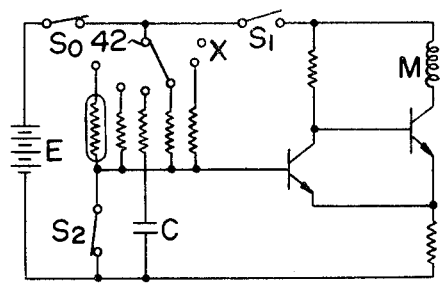
FIG. 2 is a diagram of an electric exposure control circuit used in the aforesaid embodiment.

DESCRIPTION OF THE PREFERRED EMBODIMENTS:

With reference to FIG. 1, when shutter button 1 is depressed, cooperating lever 2 is lowered, whereby gear 25 is lowered relative to gear 26 and as a result pin 26a connecting both gears 25 and 26 together is disengaged from pin 25a. Simultaneously therewith, cooperating lever 3 is lowered to rotate lever 4 in a counterclockwise direction, thereby releasing switch lever 5 from engagement with one end of lever 4; lever 5 has a tendency to rotate in the clockwise direction. The clockwise rotation of lever 5 causes pin 5a to close main switch S1, although electric-power-source switch S0 connected in series with main switch s1 is maintained closed. Electromagnet M is excited by means of a known exposure control circuit as shown in FIG. 2. Further, the clockwise rotation of switch lever 5 releases mirror lever 7, lever 7 having a tendency to rotate in a counterclockwise direction, by means of intermediate lever 6, whereby reflecting mirror 9 is switched from an observation condition to a picture taking position about shaft 8. The rotation of mirror lever 7 releases forward curtain locking 11 from engagement with locking plate 12 by means of release lever 10. In this respect, as has been described earlier, gear 25 is maintained disengaged from gear 26. Accordingly, a drive member is driven due to the rotating tendency of the forward curtain shaft by the forward curtain. The aforesaid drive member comprises locking plate 12, shaft 13, forward curtain gear 14 and gear 15. This operation commences the exposure due to the forward curtain 16, whereupon trigger switch S2 is released by the counterclockwise rotation of projection 17 mounted on shaft 13 to thereby start the charging of capacitor C. In this case, the travel of rear curtain 19 is interrupted by pin 20a of rear curtain gear 20, which is locked by pawl 18c of rear curtain locking lever 18 having armature 18d adapted to be attracted by electromagnet M.

When the voltage of capacitor C reaches a given level, electromagnet M is de-energized by transistors Tr1 and Tr2, such that rear curtain locking lever 18 rotates in a counterclockwise direction under the action of spring 18d, thereby disengaging pawl 18c from pin 20a, whereby rear curtain gear 20 and gear 21 are rotated by the rotation of the rear curtain shaft. Thus, rear curtain 19 closes the shutter to complete the exposure.

Mounted in projecting relationship or rear curtain gears 14 and 20 are pins 14a and 20b which are spaced the same distance from shaft 13 in a radial direction, respectively, such that both pins 14a and 20b engage each other, when a slit opening is not defined between both curtains 16 and 19, such as upon completion of exposure, shutter winding or shutter cocking.

The counterclockwise rotation of winding lever 22 then causes gears 23, 24 and 25 to rotate, together with gear 26 by way of clutch pins 25a and 26a, while gear 26 rotates forward curtain gear 14 in a clockwise direction. Likewise, rear curtain locking gear 20 is rotated in a clockwise direction, with pin 14a being in engagement with pin 20b, whereby locking plate 12 engages forward curtain locking lever 11 at a position beyond pawl 18c of rear curtain locking lever 18, thereby completing a shutter-cocking operation.

Meanwhile, the free end of resilient strip 51 affixed to angled projection 18e of rear curtain locking lever 18 is engageable with projection 50b formed on one end of rotary shaft 50. Pawl 50a formed on the lower end of rotary shaft 50 is adapted to engage pin 14a, when forward curtain gear 14 is rotated in a clockwise direction due to a shutter cocking operation. Thereby, projection 50b engages resilient plate 51 upon completion of the shutter cocking operation to thereby move the same, whereby rear curtain locking lever 18 is rotated in a clockwise direction against the action of spring 18d to urge armature 18b against electromagnet M. Armature 18b is attracted to electromagnet M when in this position, thereby causing pawl 18c to arrest pin 20a.

Shutter speed dial 40 is graduated in scale A for adjusting the shutter speed automatically by means of the aforesaid electrical exposure time control mechanism, a speed scale 1000, 500, 250, . . . 1 for setting the shutter speed and a scale X for controlling exposure time mechanically. Dial 40 is rotated into alignment with an index on the camera body to select the desired scale setting. Rigidly mounted on rotary shaft 42 of shutter speed dial 40 are control cam plate 41 having notched portion 41a and release cam plate 43 having projection 43a adapted to open normally closed electric-power-source switch So when projection 43a engages switch So.

Operating lever 48 is rotatably pivoted to the camera body and has a tendency to rotate clockwise under the action of spring 48d. Lever 48 has a first arm having a contact 48b which is normally maintained in abutting relation with control cam 41, such that contact 48b rotates in a clockwise direction to fit in notched portion 41a, when shutter speed dial 40 is set to the mechanical exposure control scale X. Lever 48 has a second arm, i.e., angled projection 48c which engages abutting face 18d formed on rear curtain locking lever 18 to thereby rotate that lever in a clockwise direction against the action of spring 18d, thus causing pawl 18c to be engageable with pin 20a. Furthermore, lever 48 has a third arm having surface 48a which is adapted to be positioned on the rotating locus of projection 47a of operating cam 47 mounted on forward curtain winding shaft 49 rigidly mounting gear 15 thereon. Operating lever 48 is rotated in a counterclockwise direction against the contact with projection 47a, which is caused due to the rotation of operating cam 47.

When the shutter speed dial 40 is set to a mechanical control position, the rotation of projection 43a of release cam plate 43 maintaining electric power source switch $S_0$ connected in series with main switch $S_1$ open, renders the electrical control circuit inoperable, while rear curtain lever 18 is rotated in a clockwise direction due to the clockwise rotation of operating lever 48. Then, forward locking lever 11 is disengaged from locking plate 12 due to the depression of release button 1, such that pin 20a or rear curtain gear 20 is maintained in engagement with pawl 18c of rear curtain locking lever 18, even after forward curtain 16 has started shutter-opening operation due to the rotation of forward curtain gear 14. When projection 47a abuts driving surface 48a due to rotation of shaft 49 to rotate operating lever 48 in a counterclockwise direction, rear curtain locking lever 18 is released, and thus is rotated in a counterclockwise direction under the action of spring 48d and disengaged from pin 20a, thereby releasing the rear curtain gear 20 for rotation, whereby rear curtain 19 travels so as to close the shutter, thus completing the mechanical exposure time control.

With respect to the film-winding stopping mechanism, gear 24 is provided with winding-stopping disc 31 which has notched portion 31a and is coaxial and integral with gear 24. Tied to wire 29 which connects at one end thereof with winding-stopping lever 45 rotatable relative to the camera body by means of hole 45b is an arm of winding-stopping lever 30. Spring 32 is tied between the other end of wire 29 and the camera body, whereby wire 29 is normally drawn to the left as viewed in FIG. 1. According to the aforesaid spring action, pawl 30a of winding-stopping lever 30 normally engages winding-stopping disc 31. As a result, when film winding and shutter cocking are completed due to the rotation of winding lever 22, pawl 30a engages notched portion 31a of winding-stopping disc 31, thereby interrupting the rotation of winding lever 22.

First detecting lever 27 and second detecting lever 28, engageable with pins 14a, 20b at the completion of the shutter release, are rotatably and coaxially pivoted to the camera body. When pin 14a and 20b on the forward and rearward gears 14 and 20 are rotated due to the release of the shutter and wire 29 is moved to the left, with pawl 30a in engagement with notched portion 31a, to thereby rotate release lever 45 in a counterclockwise direction, second detecting lever 28 having a tendency to rotate in a counterclockwise direction under the action of spring 32 will be rotated in a counterclockwise direction, with release lever 45 in engagement with pin 28a, to thereby be retracted from the rotating locuses of pins 14a and 20b. While first detecting lever 27 engages second detecting lever 28 via angled projection 27a and is rotated in a counterclockwise direction together therewith, to thereby be positioned on the rotating locuses of the aforesaid pins 14a and 20b.

When both detecting levers 27 and 28 are rotated in a clockwise direction by pins 14a and 20b to be released by virtue of the shutter releasing operation, pin 28a rotates winding stopping lever 30 in a clockwise direction against the action of spring 32 to thereby rotate winding-stopping lever 30 in a clockwise direction, thus releasing the engagement between pawl 30a and notched portion 31a, thereby enabling further film-winding and shutter-cocking operations.

Pin 44 projecting from release lever 45 is adapted to engage release cam plate 43. Thus, when shutter speed dial 40 is rotated to be set from an electrical exposure control scale to a mechanical exposure control scale X, projection 43a of release cam plate 43 engages pin 44 in the course of rotation thereof, thereby urging the same in a radial direction to rotate release lever 45 in a clockwise direction.

An arm of arresting lever 46 rotatably pivoted to the camera body and having a tendency to rotate in a clockwise direction by means of spring 46c is formed with hooked projection 46a, while pin 45a mounted on release lever 45, engages hooked projection 46a, thereby maintaining pawl 30a free from notched portion 31a. Thus, when shutter speed dial 40 properly selects the mechanical control scale X, projection 43a is disengaged from pin 44, while release lever 45 is arrested at a released position for rotation in a clockwise direction, by means of the engagement of pin 45a with hooked projection 46a. Then, electric-power-source switch $S_O$ is opened.

Further, the other arm 46b of arresting lever 46 is engageable with pin 20b which is to be cocked at the position of arresting lever 46 to arrest the aforesaid release lever, such that upon completion of the shutter cocking, arresting lever 46 is disengaged from release lever 45, whereby release lever 45 is rotated in a counterclockwise direction. Pawl 30a of winding-stopping lever 30 engages notched portion 31a of winding-stopping disc 31 which has just completed winding.

ELECTRICAL EXPOSURE CONTROL WITH SUFFICIENT POWER SOURCE VOLTAGE

Figure 3:
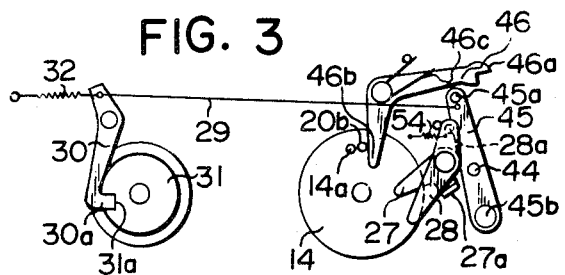
Figure 4:
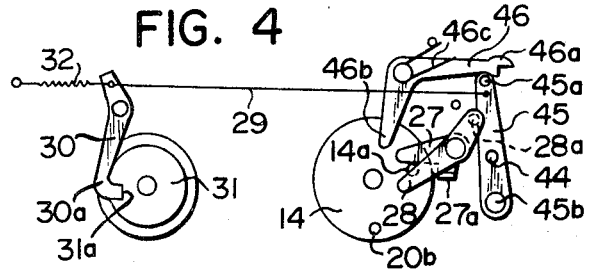

Armature 18b is attracted by electromagnet M, even if the shutter has been released due to the forward curtain 16, while pin 20a of rear curtain gear 20 is locked by pawl 18c or rear-curtain-locking lever 18, and its rotation remains stopped, until capacitor C has been charged to a given level. As a result, pin 14a as shown in FIG. 4 engages first detecting lever 27 in advance of the completion of shutter cocking as shown in FIG. 3, thereby rotating lever 27 in a clockwise direction, while second detecting lever 28 assumes a position engageable with pin 20b rotated from its retracted position.

Figure 5:
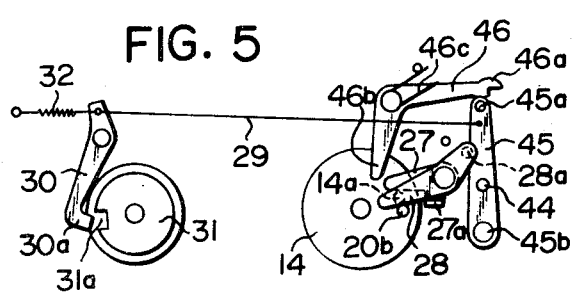

Subsequently, the excitation of electromagnet M is interrupted by the electric control circuit, and rear curtain gear 20 is rotated, while pin 20b engages second detecting lever 28 located in the aforesaid position to thereby rotate lever 28 in a clockwise direction, such that pin 28a rotates release lever 45 in a clockwise direction as shown in FIG. 5. Winding-stopping lever 30 is rotated by wire 29 against the action of spring 32, whereby pawl 30a is disengaged from notched portion 31a to release its winding-stopping action, thus enabling the subsequent winding operation and maintaining the camera in a normal condition.

ELECTRICAL EXPOSURE CONTROL WITH INSUFFICIENT POWER SOURCE VOLTAGE

Figure 6:
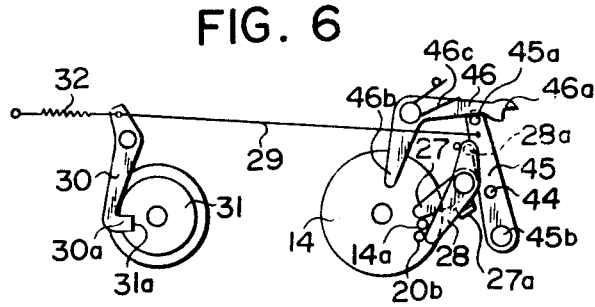

Forward curtain gear 14 is released from its locked position and begins rotating. Since electromagnet M no longer is energized to engage rear-curtain-locking lever 18 by pin 20a, rear curtain gear 20 also begins rotating and thus pin 14a would tend to rotate first detecting lever 27, with pin 14a being in contact with pin 20b, as shown in FIG. 6. As a result, second detecting lever 28 would tend to be rotated by means of angled projection 27a in a clockwise direction. However, because pin 20b is positioned inwardly of second detecting lever 28, its rotation is interrupted, with release lever 45 being interrupted from rotation in a clockwise direction by pin 28a, whereby winding-stopping disc 31 is maintained locked by winding stopping lever 30.

Thus, the subsequent winding operation is locked, despite the release of the shutter, and thus a subsequent photograph can no longer be carried out. This is the abnormal condition for the camera.

SWITCHING TO THE MECHANICAL EXPOSURE CONTROL MODE

Figure 7:
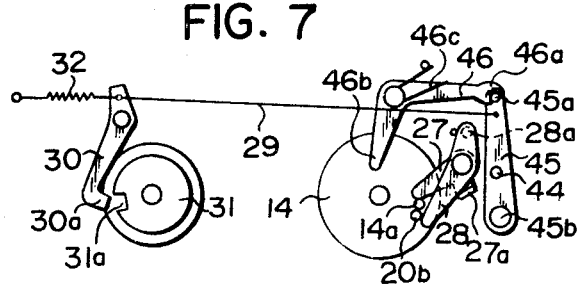
Figure 8:
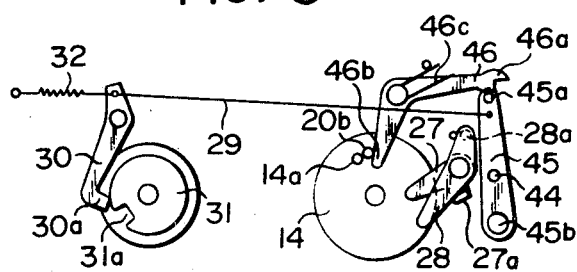

In the abnormal condition of the camera, when shutter speed dial 40 is rotated into alignment with the mechanical exposure control scale X for carrying out the exposure control mechanically, projection 43a or release cam plate 43 engages pin 44 in the course of its rotation to rotate release lever 45 in a clockwise direction. As shown in FIG. 7, hooked projection 46a of arresting lever 46 engages pin 45a in its rotational path in a clockwise direction to arrest pin 45a in the released position. Pawl 30a of winding-stopping lever 30 is disengaged from notched portion 31a of winding-stopping disc 31 to enable film winding. Moreover, upon completion of winding when the shutter cocking is completed, pin 20b as shown in FIG. 8 engages arm 46b of arresting lever 46 to thereby rotate arm 46b in a counterclockwise direction, disengaging hooked projection 46a from pin 45a, such that release lever 45 with pin 44 disengaged from projection 43a has been rotated in a counterclockwise direction. Pawl 30a engages notched portion 31a to stop the winding operation and to open electric-power-source switch $S_O$.

Simultaneously therewith, contact 48b of operating lever 48 fits in notched portion 41a of control cam plate 41, while angled projection 48c rotates rear-curtain locking lever 18 in a clockwise direction to bring pawl 18c in a position engageable with pin 20a which is located in the cocking completed position.

Accordingly, rear curtain gear 20 remains locked by pawl 18c, even after forward curtain gear 14 has been rotated to open shutter curtain gear 14 and open the shutter by means of the releasing operation. However, when operating cam 47 associated with the travel of the forward curtain engages surface 48a of operating lever 48 to rotate it counterclockwise, pin 20a is disengaged from pawl 18c, while rear curtain gear 20 begins rotating to close the shutter.

In this case, even though the voltage of cells E, i.e., the electric power source is maintained above a given voltage level, the opening of electric-power-source switch $S_O$ places the electrical control member in an idle condition, while enabling mechanical control, with shutter speed dial 40 set at mechanical exposure control scale X.

It is to be understood that the form of invention herein shown and described is to be taken as a preferred example thereof and that various changes in the shape, size and arrangement of parts are apparent without departing from the spirit of the invention or the scope of the subjoined claims.

What is claimed is:

1. A photographic camera having both electrical and mechanical shutter exposure time controls, comprising:
   electrical control means including an electric power source and an electromagnet for controlling the exposure time of the camera shutter;
   mechanical means for controlling the exposure time of the camera shutter;
   means for selecting said electrical or mechanical control means;
   means for winding the film and cocking the camera shutter;
   a film winding control member movable between an operating position for locking said means for winding and a retracted position for releasing said means for winding, said winding control member being brought into said operating position in association with the completion of a shutter cocking and film winding operation;
   detection means for detecting the initiation of shutter releasing and the energization of said electromagnet by said electrical control means with said means for selecting set for said electrical control means;
   means for moving said winding control member from said operating position to said retracted position in response to said detection means detecting the energization of said electromagnet and for retaining said winding control member in said operating position in response to said detection means detecting the non-energization of said electromagnet; and
   means for shifting said winding control member to said retracted position with said selecting means being switched from selecting said electrical control means to selecting said mechanical control means.

2. A photographic camera as in claim 1, further comprising:
   a first switch normally opened and adapted to be closed in association with the shutter release for activating said electrical control means by said power source; and
   a second switch connected in series with said first switch for activating and deactivating said electrical control means, said switch being adapted to be closed when said means for selecting selects said electrical control means and adapted to be opened when said mechanical control means is selected.

3. A photographic camera as in claim 1, wherein said means for moving comprises, a release member including an operating position for driving said film winding control member from said operating position to said retracted position thereof, and biased in an idling position to enable said film winding control member to be retained at said operating position, said release member being adapted to be shifted to said operating position in response to said detection means detecting the energization of said electromagnet.

4. A photographic camera as in claim 3, wherein the camera shutter is a curtain shutter having a forward curtain for starting exposure and a rear curtain for completing exposure, and said electrical control means includes an exposure time control circuit connected to said electric power source by a main switch adapted to be closed in association with the releasing operation as said electrical control means is selected, said electromagnet being adapted to control the completion of exposure by locking said rear curtain for an interval determined by said exposure time control circuit even after said forward curtain has started to travel.

5. A photographic camera as in claim 4, wherein said detection means includes a first lever adapted to be rotated in engagement with said forward curtain with said forward curtain in a released position, and a second lever adapted to be rotated in response to the rotation of said first lever to a position engageable with said rear curtain which is adapted to start to travel to the released position after the lapse of said interval, said second lever being adapted for shifting said release member from said idling position to said operating position thereof when said second lever is engaged by said rear curtain, and said second lever being unable to shift said release member by means of the movement of said rear curtain to its release position before said forward curtain rotates said first lever because of the non-energization of said electromagnet.

6. A photographic camera having both electrical and mechanical shutter exposure time controls comprising in combination:
    a shutter;
    electrical control mean including an electric power source for controlling the exposure time period of said shutter;
    mechanical means for controlling the exposure time period of said shutter;
    means for selecting one of said electrical and mechanical control means;
    means for detecting a drop in the output voltage of said electric power source when said selecting means selects said electrical control means;
    means for switching the camera from a normal condition to an abnormal condition in response to the detection of said detecting means, for preventing misoperation of the camera due to a voltage drop of said electric power source; and
    means for shifting said switching mean from the abnormal condition to the normal condition upon said selecting means being switched from its position to select said electrical control means to its position to select said mechanical control means.

7. A photographic camera as in claim 6, further comprising:
    a shutter release means for controlling the release of said shutter;
    an exposure time control circuit including an electromagnet operable according to the output of said exposure time control circuit for controlling the termination of the exposure time;
    a first switch normally opened for connecting said exposure time control circuit with said electric power source and adapted to be closed in association with the shutter release; and
    a second switch connected in series with said first switch between said electric power source and said exposure time control circuit, said switch being adapted to be closed when said means for selecting selects said electrical control means and adapted to be opened when said mechanical control means is selected.

8. A photographic camera as in claim 7, further comprising shutter opening means and shutter closing means; and wherein said electrical control means includes means for actuating said shutter closing means in cooperation with said electromagnet and said mechanical control means includes means for restraining said means for actuating and means for releasing the restraint when said shutter opening means moves to a predetermined position whereby the exposure time is mechanically controlled.

9. A photographic camera as in claim 3, further comprising means for enabling said release member to be shifted to said idling position during operation of said means for winding.

10. A photographic camera as in claim 1, further comprising a shutter speed dial for setting the mechanical shutter exposure time control, said means for selecting being adapted to be controlled by said shutter speed dial.

* * * * *